(12) United States Patent
Ohta et al.

(10) Patent No.: US 11,696,175 B2
(45) Date of Patent: Jul. 4, 2023

(54) BASE STATION DEVICE, TERMINAL DEVICE, COMMUNICATION METHOD, AND COMMUNICATION SYSTEM

(71) Applicant: FUJITSU LIMITED, Kawasaki (JP)

(72) Inventors: Yoshiaki Ohta, Yokohama (JP); Takayoshi Ode, Yokohama (JP); Yoshihiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 99 days.

(21) Appl. No.: 17/039,028

(22) Filed: Sep. 30, 2020

(65) Prior Publication Data

US 2021/0014731 A1 Jan. 14, 2021

Related U.S. Application Data

(63) Continuation of application No. PCT/JP2018/014338, filed on Apr. 3, 2018.

(51) Int. Cl.
*H04W 28/06* (2009.01)
*H04L 1/00* (2006.01)
*H04L 69/22* (2022.01)
*H04W 80/02* (2009.01)

(52) U.S. Cl.
CPC ............ *H04W 28/06* (2013.01); *H04L 1/008* (2013.01); *H04L 69/22* (2013.01); *H04W 80/02* (2013.01)

(58) Field of Classification Search
CPC ......... H04W 28/06; H04L 1/008; H04L 69/22
See application file for complete search history.

(56) References Cited

U.S. PATENT DOCUMENTS

| | | |
|---|---|---|
| 2009/0003283 A1 | 1/2009 | Meylan |
| 2016/0302248 A1 | 10/2016 | Yi et al. |
| 2017/0288821 A1* | 10/2017 | Baek ............... H04L 47/34 |
| 2019/0173655 A1 | 6/2019 | Shimezawa |
| 2019/0281655 A1* | 9/2019 | Kim ............... H04L 1/1621 |
| 2019/0306801 A1* | 10/2019 | Zhou ............... H04W 52/44 |
| 2021/0058919 A1* | 2/2021 | Takeda ............... H04L 1/1664 |
| 2022/0385440 A1 | 12/2022 | Shimezawa |

FOREIGN PATENT DOCUMENTS

| | | |
|---|---|---|
| JP | 2010-527544 A | 8/2010 |
| JP | 2017-506011 A | 2/2017 |

(Continued)

OTHER PUBLICATIONS

NTT Docomo, Inc., "Email discussion report on SO segmentation", Agenda Item 10.3.2.2, 3GPP TSG-RAN WG2 Meeting #97bis, R2-1702646, Spokane, USA, Apr. 3-7, 2017.*

(Continued)

*Primary Examiner* — Jamal Javaid
*Assistant Examiner* — Ryan C Kavleski
(74) *Attorney, Agent, or Firm* — Myers Wolin, LLC

(57) ABSTRACT

A base station device includes, a transmitter that transmits first data of a first type and second data of a second type, and a controller that is able to omit, when the transmitter multiplexes the first data and the second data together and transmits the first data and the second data multiplexed together, at least a portion of a segmentation offset or at least a portion of a reserve bit included in an RLC header of the second data.

19 Claims, 16 Drawing Sheets

(56) References Cited

FOREIGN PATENT DOCUMENTS

| | | |
|---|---|---|
| JP | 2018-26705 A | 2/2018 |
| WO | 2018/030049 A1 | 2/2018 |

OTHER PUBLICATIONS

Oppo, "RLC Segmentation in NR", Agenda Item: 10.3.2.2, 3GPP TSG-RAN WG2 Meeting #97bis, R2-1702547, Spokane, USA, Apr. 3-7, 2017.*

NTT Docomo, Inc., "Email discussion report on SO segmentation", Agenda Item 10.3.2.2., GGPP TSG-RAN WG2 Meeting #97bis, R2-1702646, Spokane, USA, Apr. 3-7, 2017.*

Cmcc et al., "Further thoughts on concatenation at PDCP", Agenda Item: 10.2.3.1, 3GPP TSG-RAN WG2 Meeting #97bis, R2-1702930, Spokane, USA, Apr. 3-7, 2017.*

Samsung, "PDCP PDU format for NR", Agenda Item 10.3.3.2, 3GPP TSG-RAN WG2 Meeting #97bis, R2-1703582, Spokane, USA, Apr. 3-7, 2017.*

International Search Report issued by the Japan Patent Office for corresponding International Patent Application No. PCT/JP2018/014338, dated May 15, 2018, with an English translation.

Written Opinion of the International Searching Authority issued for corresponding International Patent Application No. PCT/JP2018/014338 dated May 15, 2018, with an English translation.

3GPP TS 36.211 V15.0.0, "3rd Generation Partnership Project; Technical Specification Group Radio Access Network; Evolved Universal Terrestrial Radio Access (E-UTRA); Physical channels and modulation (Release 15)", Dec. 2017.

3GPP TS 36.212 V15.0.1, "3rd Generation Partnership Project; Technical Specification Group Radio Access Network; Evolved Universal Terrestrial Radio Access (E-UTRA); Multiplexing and channel coding (Release 15)", Jan. 2018.

3GPP TS 36.213 V15.0.0, "3rd Generation Partnership Project; Technical Specification Group Radio Access Network; Evolved Universal Terrestrial Radio Access (E-UTRA); Physical layer procedures (Release 15)", Dec. 2017.

3GPP TS 36.300 V15.0.0, "3rd Generation Partnership Project; Technical Specification Group Radio Access Network; Evolved Universal Terrestrial Radio Access (E-UTRA); and Evolved Universal Terrestrial Radio Access Network (E-UTRAN); Overall description; Stage 2 (Release 15)", Dec. 2017.

3GPP TS 36.321 V15.0.0, "3rd Generation Partnership Project; Technical Specification Group Radio Access Network; Evolved Universal Terrestrial Radio Access (E-UTRA); Medium Access Control (MAC) protocol specification (Release 15)", Dec. 2017.

3GPP TS 36.322 V15.0.0, "3rd Generation Partnership Project; Technical Specification Group Radio Access Network; Evolved Universal Terrestrial Radio Access (E-UTRA); Radio Link Control (RLC) protocol specification (Release 15)", Dec. 2017.

3GPP TS 36.323 V14.5.0, "3rd Generation Partnership Project; Technical Specification Group Radio Access Network; Evolved Universal Terrestrial Radio Access (E-UTRA); Packet Data Convergence Protocol (PDCP) specification (Release 14)", Dec. 2017.

3GPP TS 36.331 V15.0.1, "3rd Generation Partnership Project; Technical Specification Group Radio Access Network; Evolved Universal Terrestrial Radio Access (E-UTRA); Radio Resource Control (RRC); Protocol specification (Release 15)", Jan. 2018.

3GPP TS 36.413 V15.0.0, "3rd Generation Partnership Project; Technical Specification Group Radio Access Network; Evolved Universal Terrestrial Radio Access Network (E-UTRAN); S1 Application Protocol (S1AP) (Release 15)", Dec. 2017.

3GPP TS 36.423 V15.0.0, 3rd Generation Partnership Project; Technical Specification Group Radio Access Network; Evolved Universal Terrestrial Radio Access Network (E-UTRAN); X2 application protocol (X2AP) (Release 15), Dec. 2017.

3GPP TS 36.425 V14.0.0, "3rd Generation Partnership Project; Technical Specification Group Radio Access Network; Evolved Universal Terrestrial Radio Access Network (E-UTRAN); X2 interface user plane protocol (Release 14)", Mar. 2017.

3GPP TS 37.340 V15.0.0, "3rd Generation Partnership Project; Technical Specification Group Radio Access Network; Evolved Universal Terrestrial Radio Access (E-UTRA) and NR; Multi-connectivity; Stage 2 (Release 15)", Dec. 2017.

3GPP TS 38.201 V15.0.0, "3rd Generation Partnership Project; Technical Specification Group Radio Access Network; NR; Physical layer; General description (Release 15)", Dec. 2017.

3GPP TS 38.202 V15.0.0, "3rd Generation Partnership Project; Technical Specification Group Radio Access Network; NR; Services provided by the physical layer (Release 15)", Dec. 2017.

3GPP TS 38.211 V15.0.0, "3rd Generation Partnership Project; Technical Specification Group Radio Access Network; NR; Physical channels and modulation (Release 15)", Dec. 2017.

3GPP TS 38.212 V15.0.0, "3rd Generation Partnership Project; Technical Specification Group Radio Access Network; NR; Multiplexing and channel coding (Release 15)", Dec. 2017.

3GPP TS 38.213 V15.0.0, "3rd Generation Partnership Project; Technical Specification Group Radio Access Network; NR; Physical layer procedures for control (Release 15)", Dec. 2017.

3GPP TS 38.214 V15.0.0, "3rd Generation Partnership Project; Technical Specification Group Radio Access Network; NR; Physical layer procedures for data (Release 15)", Dec. 2017.

3GPP TS 38.215 V15.0.0, "3rd Generation Partnership Project; Technical Specification Group Radio Access Network; NR; Physical layer measurements (Release 15)", Dec. 2017.

3GPP TS 38.300 V15.0.0, "3rd Generation Partnership Project; Technical Specification Group Radio Access Network; NR; NR and NG-RAN Overall Description; Stage 2 (Release 15)", Dec. 2017.

3GPP TS 38.321 V15.0.0, "3rd Generation Partnership Project; Technical Specification Group Radio Access Network; NR; Medium Access Control (MAC) protocol specification (Release 15)", Dec. 2017.

3GPP TS 38.322 V15.0.0, "3rd Generation Partnership Project; Technical Specification Group Radio Access Network; NR; Radio Link Control (RLC) protocol specification (Release 15)", Dec. 2017.

3GPP TS 38.323 V15.0.0, "3rd Generation Partnership Project; Technical Specification Group Radio Access Network; NR; Packet Data Convergence Protocol (PDCP) specification (Release 15)", Dec. 2017.

3GPP TS 38.331 V15.0.0, "3rd Generation Partnership Project; Technical Specification Group Radio Access Network NR Radio Resource Control (RRC) protocol specification (Release 15)", Dec. 2017.

3GPP TS 38.401 V15.0.0, "3rd Generation Partnership Project; Technical Specification Group Radio Access Network; NG-RAN; Architecture description (Release 15)", Dec. 2017.

3GPP TS 38.410 V0.6.0, "3rd Generation Partnership Project; Technical Specification Group Radio Access Network; NG-RAN; NG general aspect and principles (Release 15)", Dec. 2017, clean version, with cover sheet and list of open issues.

3GPP TS 38.410 V0.6.0, "3rd Generation Partnership Project; Technical Specification Group Radio Access Network; NG-RAN; NG general aspect and principles (Release 15)", Dec. 2017, marked up version.

3GPP TS 38.413 V0.5.0, "3rd Generation Partnership Project; Technical Specification Group Radio Access Network; NG Radio Access Network (NG-RAN); NG Application Protocol (NGAP) (Release 15)", Dec. 2017, clean version, with cover sheet and list of open issues.

3GPP TS 38.413 V0.5.0, "3rd Generation Partnership Project; Technical Specification Group Radio Access Network; NG Radio Access Network (NG-RAN); NG Application Protocol (NGAP) (Release 15)", Dec. 2017, marked up version.

3GPP TS 38.420 V0.5.0, "3rd Generation Partnership Project; Technical Specification Group Radio Access Network; NG-RAN; Xn general aspects and principles (Release 15)", Dec. 2017, clean version, with cover sheet.

3GPP TS 38.420 V0.5.0, "3rd Generation Partnership Project; Technical Specification Group Radio Access Network; NG-RAN; Xn general aspects and principles (Release 15)", Dec. 2017, marked up version.

(56) References Cited

OTHER PUBLICATIONS

3GPP TS 38.423 V0.5.0, "3rd Generation Partnership Project; Technical Specification Group Radio Access Network; NG Radio Access Network (NG-RAN); Xn application protocol (XnAP) (Release 15)", Dec. 2017, clean version, with cover sheet.
3GPP TS 38.423 V0.5.0, "3rd Generation Partnership Project; Technical Specification Group Radio Access Network; NG Radio Access Network (NG-RAN); Xn application protocol (XnAP) (Release 15)", Dec. 2017, marked up version.
3GPP TS 38.470 V15.0.0, "3rd Generation Partnership Project; Technical Specification Group Radio Access Network; NG-RAN; F1 general aspects and principles (Release 15)", Jan. 2018.
3GPP TS 38.473 V15.0.0, "3rd Generation Partnership Project; Technical Specification Group Radio Access Network; NG-RAN; F1 application protocol (F1AP) (Release 15)", Dec. 2017.
3GPP TR 38.801 V14.0.0, "3rd Generation Partnership Project; Technical Specification Group Radio Access Network; Study on new radio access technology: Radio access architecture and interfaces (Release 14)", Mar. 2017.
3GPP TR 38.802 V14.2.0, "3rd Generation Partnership Project; Technical Specification Group Radio Access Network; Study on New Radio Access Technology Physical Layer Aspects (Release 14)", Sep. 2017.
3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.
3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.
3GPP TR 38.900 V14.3.1, "3rd Generation Partnership Project; Technical Specification Group Radio Access Network; Study on channel model for frequency spectrum above 6 GHz (Release 14)", Jul. 2017.
3GPP TR 38.912 V14.1.0, "3rd Generation Partnership Project; Technical Specification Group Radio Access Network; Study on New Radio (NR) access technology (Release 14)", Jun. 2017.
3GPP TR 38.913 V14.3.0, "3rd Generation Partnership Project; Technical Specification Group Radio Access Network; Study on Scenarios and Requirements for Next Generation Access Technologies; (Release 14)", Jun. 2017.
NTT Docomo, "New SID Proposal: Study on New Radio Access Technology", Agenda Item: 9.1, 3GPP TSG-RAN Meeting #71, RP-160671, Göteborg, Sweden, Mar. 7-10, 2016.
NTT Docomo, Inc., "On co-existence of eMBB and URLLC", Agenda Item: 8.1.8, 3GPP TSG-RAN WG1 Meeting #86, R1-167391, Gothenburg, Sweden, Aug. 22-26, 2016.
Notice of Reasons for Refusal issued by the Japan Patent Office for corresponding Japanese Patent Application No. 2020-512141, dated Jan. 11, 2022, with a full English machine translation.
First Notification of Office Action and Search Report issued by the China National Intellectual Property Administration for corresponding Chinese Patent Application No. 201880092023.6, dated Apr. 24, 2023, with an English translation.

* cited by examiner

FIG. 8A

| SI | Si SN |
|---|---|

RLC HEADER PATTERN 2

FIG. 8B

| S1 | S2 | S3 | S4 | S5 | S6 | S7 | S8 |
|---|---|---|---|---|---|---|---|

Si PATTERN 1

| SI=01 | 1 | 0 | 0 | 0 | 0 | 0 | SN=100 |
|---|---|---|---|---|---|---|---|

FIG. 9A

| SI=11 | 0 | 1 | 0 | 0 | 0 | 0 | SN=100 |
|---|---|---|---|---|---|---|---|

FIG. 9B

| SI=10 | 0 | 0 | 1 | 0 | 0 | 0 | SN=100 |
|---|---|---|---|---|---|---|---|

FIG. 9C

FIG. 10A  Si PATTERN 2: R | S2 | S3 | S4 | S5 | S6 | S7 | S8

FIG. 10B  Si PATTERN 3: R | S1 | S2 | S3 | S4 | S5 | S6 | S7

FIG. 10C  Si PATTERN 4: R | S2 | S3 | S4 | S5 | S6 | S7 | R

FIG. 10D  Si PATTERN 5: R | S1 | S2 | S3 | S4 | S5 | S6 | R

FIG. 10E  Si PATTERN 6: R | R | S1 | S2 | S3 | S4 | S5 | S6

UNSEGMENTED PDCP HEADER PATTERN 1

| SI | R | R | R | R | R | R | R |
|----|---|---|---|---|---|---|---|
| DC | R | R | R | PDCP SN | | | |
| PDCP SN (CONTINUATION) | | | | | | | |

FIG. 16A

UNSEGMENTED PDCP HEADER PATTERN 2

| SI | R | DC | PDCP SN |
|----|---|----|---------|
| PDCP SN (CONTINUATION) | | | |

FIG. 16B

SEGMENTED PDCP HEADER PATTERN 1

| SI | RLC SN |
|---|---|
| SO | |
| DC | R | R | R | PDCP SN |
| PDCP SN (CONTINUATION) | | | | |
| SO (CONTINUATION) | | | | |

FIG. 17A

SEGMENTED PDCP HEADER PATTERN 2

| SI | RLC SN |
|---|---|
| SO | |
| SO (CONTINUED 3bits) | DC | PDCP SN |
| PDCP SN (CONTINUATION) | | |

FIG. 17B

SEGMENTED PDCP HEADER PATTERN 3

| SI | RLC SN |
|---|---|
| SO (3bits) | DC | PDCP SN |
| PDCP SN (CONTINUATION) | | |

FIG. 17C

UNSEGMENTED PDCP HEADER PATTERN

| SI | PDCP SN (6 bits) |
|---|---|

FIG. 18A

SEGMENTED PDCP HEADER PATTERN

| SI | PDCP SN (6 bits) |
|---|---|
| SO | |

FIG. 18B

SEGMENTED CONCATENATED HEADER PATTERN 1

| SI | R | DC | PDCP SN |
|---|---|---|---|
| PDCP SN (CONTINUATION) | | | |
| SO OR Si | | | |

FIG. 19A

SEGMENTED CONCATENATED HEADER PATTERN 2

| SI | R | DC | SO OR Si |
|---|---|---|---|
| | | | PDCP SN |
| SO OR Si (CONTINUATION) | | | |
| PDCP SN (CONTINUATION) | | | |

FIG. 19B

| SEGMENTED CONCATENATED HEADER PATTERN 3 | |
|---|---|
| SI | PDCP SN (6bits) |
| | SO OR Si |

FIG. 20A

| SEGMENTED CONCATENATED HEADER PATTERN 4 | |
|---|---|
| SI | SO OR Si |
| | PDCP SN (6bits) |
| SO OR Si (CONTINU-ATION) | |

FIG. 20B

AM RLC HEADER PATTERN 1

| DC | P | SI | SN (4 bits) |
|---|---|---|---|
| | | | SN (CONTINUATION) |
| | | | Si OR SO |

FIG. 21A

AM RLC HEADER PATTERN 2

| DC | P | SI | R | R | SN (2 bits) |
|---|---|---|---|---|---|
| | | | | | SN (CONTINUATION) |
| | | | | | SN (CONTINUATION) |
| | | | | | Si OR SO |

FIG. 21B

AM UNSEGMENTED CONCATENATED HEADER PATTERN

| DC | P | SI | PDCP SN |
|---|---|---|---|

FIG. 22A

AM SEGMENTED CONCATENATED HEADER PATTERN

| DC | P | SI | PDCP SN |
|---|---|---|---|
| | | | SO OR Si |

FIG. 22B

BASE STATION DEVICE, TERMINAL DEVICE, COMMUNICATION METHOD, AND COMMUNICATION SYSTEM

CROSS-REFERENCE TO RELATED APPLICATION

This application is a continuation application of International Application Number PCT/JP2018/014338 filed on Apr. 3, 2018 and designated the U.S., the entire contents of which are incorporated herein by reference.

FIELD

The present invention relates to a base station device, a terminal device, a communication method, and a communication system.

BACKGROUND

In a current network, traffic of mobile terminals (smartphones and feature phones) accounts for the majority of network resources. In addition, the traffic used by the mobile terminals tends to continue to expand.

Meanwhile, with development of IoT (Internet of Things) services (e.g., monitoring systems such as a traffic system, a smart meter, and a device), it has been demanded that an approach to cope with services including various requirement. Consequently, in communications standards for 5th generation (5G or NR (New Radio)) mobile communication, it has been demanded that, in addition to 4G (4th generation mobile communication) standard techniques, techniques, which achieve a higher data rate, a larger capacity, and lower latency. For the 5th generation communication standards, 3GPP working groups (such as, e.g., TSG-RAN WG1 and TSG-RAN WG2) have been making a progress on technical study.

To cope with various services, 5G communication assumes providing support for numerous use cases categorized into, e.g., eMBB (Enhanced Mobile BroadBand), Massive MTC (Machine Type Communications), and URLLC (Ultra-Reliable and Low Latency Communication). In particular, the URLLC, requiring both ultra-high reliability and low latency, is one of the use cases that is hard to implement.

Also, 5G communication needs to be able to simultaneously support ultra-high-reliability/low-latency communication data (URLLC data) and another data (such as, e.g., eMBB data) with the same carrier. To accomplish this, it is desired not to impair a frequency use efficiency.

Techniques related to 5G communication are described in related art literature below.

CITATION LIST

Non-Patent Literature

NPL 1: 3GPP TS 36.211 V15.0.0 (2017-12)
NPL 2: 3GPP TS 36.212 V15.0.1 (2018-01)
NPL 3: 3GPP TS 36.213 V15.0.0 (2017-12)
NPL 4: 3GPP TS 36.300 V15.0.0 (2017-12)
NPL 5: 3GPP TS 36.321 V15.0.0 (2017-12)
NPL 6: 3GPP TS 36.322 V15.0.0 (2017-12)
NPL 7: 3GPP TS 36.323 V14.5.0 (2017-12)
NPL 8: 3GPP TS 36.331 V15.0.1 (2018-01)
NPL 9: 3GPP TS 36.413 V15.0.0 (2017-12)
NPL 10: 3GPP TS 36.423 V15.0.0 (2017-12)
NPL 11: 3GPP TS 36.425 V14.0.0 (2017-03)
NPL 12: 3GPP TS 37.340 V15.0.0 (2017-12)
NPL 13: 3GPP TS 38.201 V15.0.0 (2017-12)
NPL 14: 3GPP TS 38.202 V15.0.0 (2017-12)
NPL 15: 3GPP TS 38.211 V15.0.0 (2017-12)
NPL 16: 3GPP TS 38.212 V15.0.0 (2017-12)
NPL 17: 3GPP TS 38.213 V15.0.0 (2017-12)
NPL 18: 3GPP TS 38.214 V15.0.0 (2017-12)
NPL 19: 3GPP TS 38.215 V15.0.0 (2017-12)
NPL 20: 3GPP TS 38.300 V15.0.0 (2017-12)
NPL 21: 3GPP TS 38.321 V15.0.0 (2017-12)
NPL 22: 3GPP TS 38.322 V15.0.0 (2017-12)
NPL 23: 3GPP TS 38.323 V15.0.0 (2017-12)
NPL 24: 3GPP TS 38.331 V15.0.0 (2017-12)
NPL 25: 3GPP TS 38.401 V15.0.0 (2017-12)
NPL 26: 3GPP TS 38.410 V0.6.0 (2017-12)
NPL 27: 3GPP TS 38.413 V0.5.0 (2017-12)
NPL 28: 3GPP TS 38.420 V0.5.0 (2017-12)
NPL 29: 3GPP TS 38.423 V0.5.0 (2017-12)
NPL 30: 3GPP TS 38.470 V15.0.0 (2018-01)
NPL 31: 3GPP TS 38.473 V15.0.0 (2017-12)
NPL 32: 3GPP TR 38.801 V14.0.0 (2017-04)
NPL 33: 3GPP TR 38.802 V14.2.0 (2017-09)
NPL 34: 3GPP TR 38.803 V14.2.0 (2017-09)
NPL 35: 3GPP TR 38.804 V14.0.0 (2017-03)
NPL 36: 3GPP TR 38.900 V14.3.1 (2017-07)
NPL 37: 3GPP TR 38.912 V14.1.0 (2017-06)
NPL 38: 3GPP TR 38.913 V14.3.0 (2017-06)
NPL 39: "New SID Proposal: Study on New Radio Access Technology", NTT docomo, RP-160671, 3GPP TSG RAN Meeting #71, Goteborg, Sweden, 7-10 Mar. 2016
NPL 40: "On co-existence of eMBB and URLLC", NTT docomo, R1-167391, 3GPP TSG RAN WG1 Meeting #86, Gothenburg, Sweden 22-26 Aug. 2016

The URLLC is assumed to transmit, e.g., small-sized data. However, when a data size is small, a header part accounts for a large proportion of a transmission message and this increases an overhead due to transmitting the header part. In this case, low latency demanded of the URLLC may not be achieved.

SUMMARY

A base station device includes,
a transmitter that transmits first data of a first type and second data of a second type, and
a controller that is able to omit, when the transmitter multiplexes the first data and the second data together and transmits the first data and the second data multiplexed together, at least a portion of a segmentation offset or at least a portion of a reserve bit included in an RLC header of the second data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 8A and 8B depict diagrams illustrating an example of an RLC header pattern 2;

FIGS. 9A, 9B and 9C depict diagrams illustrating an example of the RLC header pattern 2 in the Si pattern 1;

FIGS. 10A, 10B, 10C, 10D and 10E depict diagrams illustrating an example of a Si pattern in which an R bit is set in a portion of Si.

FIGS. 11A, 11B and 11C depict diagrams illustrating an example of a header in which Si in the first data is omitted in each of the RLC header pattern 2 and the Si pattern 2;

FIGS. 12A, 12B and 12C depict diagrams illustrating an example of a header in which Si in each of first data and last data is omitted in each of the RLC header pattern 2 and the Si pattern 4;

FIGS. 14A, 14B and 14C depict diagrams illustrating an example of a header of the RLC header pattern 3 in which SO in first data is omitted;

FIGS. 15A, 15B and 15C depict diagrams illustrating an example of a header of the RLC header pattern 3 in which SO in each of first data and last data is omitted;

FIGS. 16A and 16B depict diagrams illustrating an example of an unsegmented PDCP header pattern;

FIGS. 17A, 17B and 17C depict diagrams illustrating an example of a segmented PDCP header pattern;

FIGS. 18A and 18B depict diagrams illustrating an example of a PDCP header in which PDCP SN is defined to have 6 bits;

FIGS. 19A and 19B depict diagrams illustrating a segmented concatenated header pattern;

FIGS. 20A and 20B depict diagrams illustrating an example of a segmented concatenated header pattern;

FIGS. 21A and 21B depict diagrams illustrating an example of an RLC header pattern corresponding to AM; and FIGS. 22A and 22B depict diagrams illustrating an example of a header pattern obtained by concatenating a PDCP header and an AM RLC header each corresponding to AM together.

DESCRIPTION OF EMBODIMENTS

The present embodiment will be described below in detail with reference to the Figures. Objects and examples in the present specification are exemplary, and do not limit the scope of the present application. Particularly, the technology of the present application is applicable even if expressions in the description are different, as long as technologically equivalent, and different expressions do not limit the scope of the present application.

First Embodiment

First, a description will be given of a first embodiment.

Figure 1:
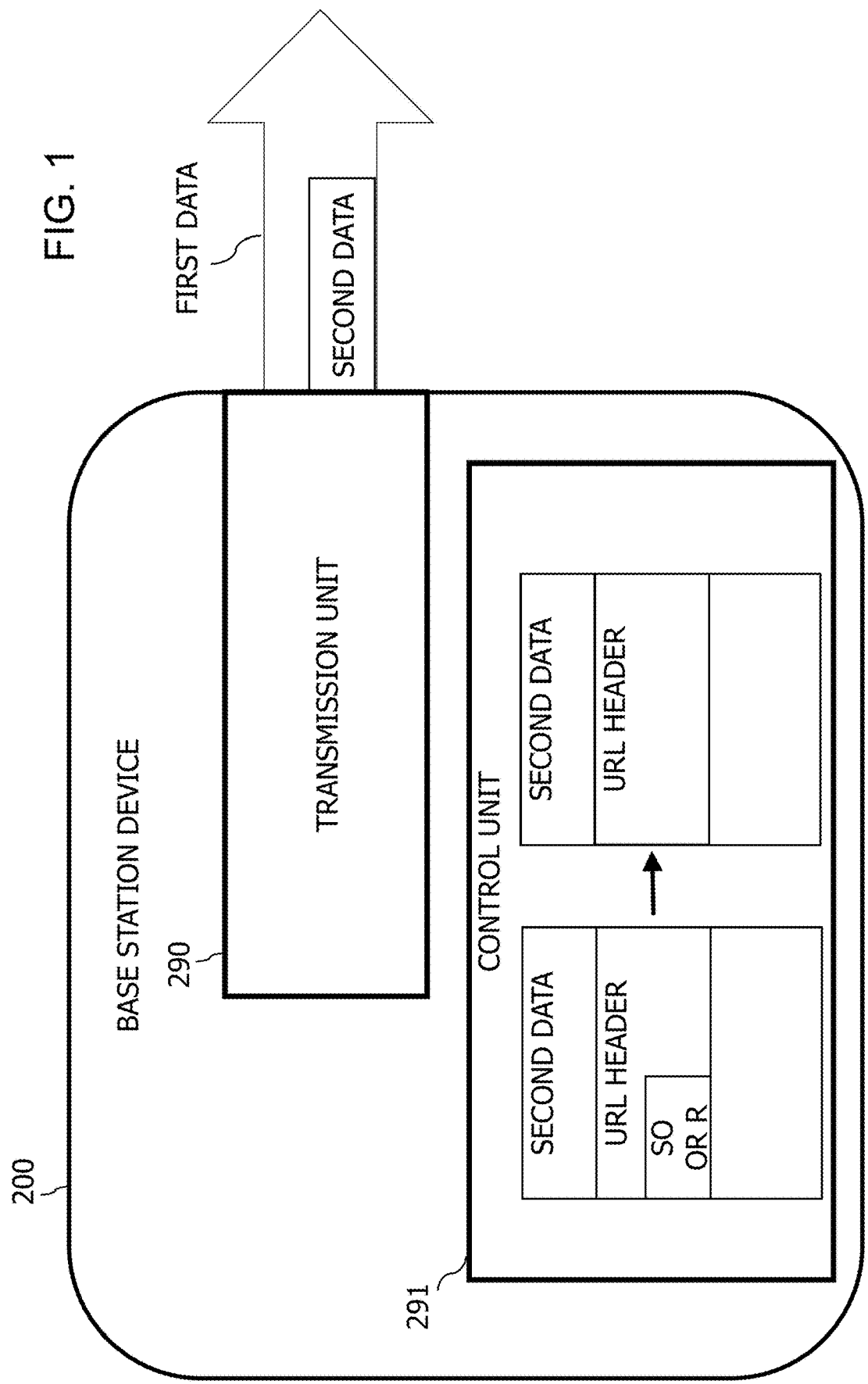
FIG. 1 depicts a diagram illustrating an example of a configuration of a communication system 10.

FIG. 1 depicts a diagram illustrating an example of a configuration of a communication system 10. A base station device 200 transmits first data and second data to a communication partner device (not illustrated).

The base station device 200 has a transmission unit 290 and a control unit 291. The transmission unit 290 and the control unit 291 are built by, e.g., causing a computer or a processor of the base station device 200 to load a program and execute the program.

The base station device 200 is a device that transmits data and is, e.g., gNodeB in 5G communication. The base station device 200 transmits first data of a first type (e.g., eMBB) and second data of a second type (e.g., URLLC). The base station device 200 may multiplex the first data and the second data together and transmit the first data and the second data multiplexed together.

The transmission unit 290 transmits the first data and the second data. When, e.g., timing of transmitting the second data comes during the transmission of the first data, the transmission unit 290 multiplexes the first data and the second data together and transmits the first data and the second data multiplexed together.

When the transmission unit 290 multiplexes the first data and the second data together and transmits the first data and the second data multiplexed together, the control unit 291 omits at least a portion of a segmentation offset (SO) included in an RLC header of the second data.

The segmentation offset is an information element indicating to which position in a PDU before segmentation (e.g., which byte position from a starting position) the starting or ending position of a data segment corresponds.

Note that, when, e.g., a reserve (R) bit representing a reserved region is included in the RLC header, the control unit 291 may omit also at least a portion of the reserve bit. When the reserve bit is omitted, it may be possible that the control unit 291 simultaneously omits or does not simultaneously omit the segmentation offset.

When, e.g., the second data is unsegmented data, the control unit 291 omits the entire segmentation offset. When, e.g., the second data is a data segment and the second data is smaller than a predetermined value, or when the starting or ending position of the data segment can be represented even when a portion of the segmentation offset is omitted, the control unit 291 omits a portion of the segmentation offset.

As a result, the base station device 200 can reduce an amount of data in the RLC header and reduce an overhead due to transmission of a header portion.

Second Embodiment

Next, a description will be given of a second embodiment.

<Example of Configuration of Communication System>

Figure 2:
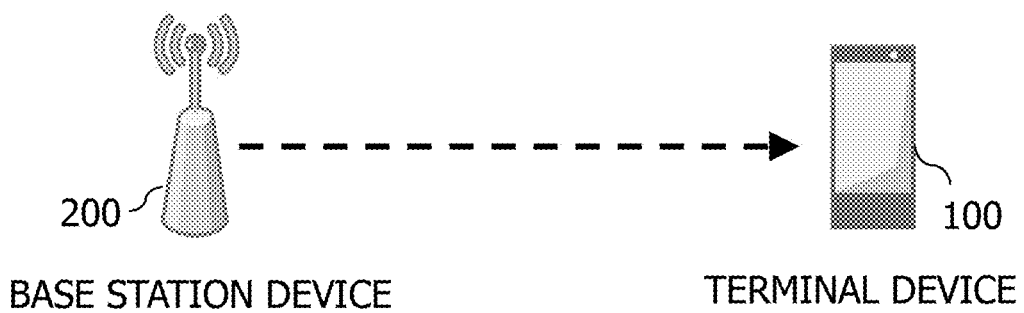
FIG. 2 depicts a diagram illustrating an example of a configuration of the communication system 10.

FIG. 2 depicts a diagram illustrating an example of a configuration of the communication system 10. The communication system 10 includes a terminal device 100 and the base station device 200. The communication system 10 is a communication system conforming to, e.g., 5G-based wireless communication. The communication system 10 is a communication system conforming to a protocol stack mentioned below.

In communications standards for a wireless communication system, in general, specifications are defined as the protocol stack (referred to also as a hierarchical protocol) in which functions of wireless communication are divided into series of layers. For example, a physical layer is defined as a first layer, a data link layer is defined as a second layer, and a network layer is defined as a third layer. In a 4th generation mobile communication system such as LTE, the second layer is divided into a plurality of sub-layers to include a MAC (Medium Access Control) layer, an RLC (Radio Link Control) layer, and a PDCP (Packet Data Convergence Protocol) layer. In the 4th generation mobile communication system, the first layer is formed of a PHY (Physical) layer, and the third layer is formed of an RRC (Radio Resource Control) layer (the RRC layer has only a control plane).

Each of the layers in a transmission device in a wireless communication system performs processing conforming to a predetermined protocol, such as addition of a header, on a data block (referred to also as a service data unit (SDU)) from a higher-level layer to generate the protocol data unit (PDU) as an information unit to be exchanged between peer processes in a reception device, and forwards the protocol data unit to a lower-level layer. For example, in an RLC layer of the LTE, PDCP-PDU as a data block from the PDCP layer serving as the higher-level layer is regarded as RLC-SDU and, through concatenation of the plurality of RLC-SDUs within a range not longer than a TB (Transport Block) length reported from the lower-level layer or the like, RLC-PDU is generated. Such RLC-PDU is forwarded to the MAC layer serving as the lower-level layer in a state where an RLC header having a sequence number (SN) in the RLC layer is added thereto.

Each of the layers in the reception device in the wireless communication system receives a data block (referred to also as the PDU) from the lower-level layer and forwards a data block (referred to also as the SDU) retrieved through removal of a header or the like to the upper-level layer. For example, in the RLC of the LTE, by referring to the RLC header added to the data block (referred to also as MAC-SDU or RLC-PDU) from the MAC layer serving as the lower-level layer, reassemble of the plurality of RLC-SDUs stored in one RLC-PDU is performed, and the RLC-SDU is forwarded to the PDCP layer serving as the higher-level layer. At that time, to guarantee an order of the RLC-SDUs, in the reassemble of the RLC-SDUs, reordering based on RLC sequence numbers of the RLC headers is performed. Then, when occurrence of a gap of the RLC sequence numbers is detected, RLC retransmission control requesting retransmission of the RLC-PDUs to the transmission device is performed.

When receiving data transmitted from a network (not illustrated) to the terminal device 100, the base station device 200 wirelessly transmits the data to the terminal device 100. The base station device 200 is, e.g., the gNodeB conforming to 5G standards.

The terminal device 100 is a mobile communication terminal such as, e.g., a smart phone or a tablet terminal, which performs communication with the base station device 200 or with another communication device via the base station device 200.

For example, when transmitting data for the URLLC to the terminal device 100, the base station device 200 uses a portion of resources for transmitting data for the eMBB.

Figure 3:
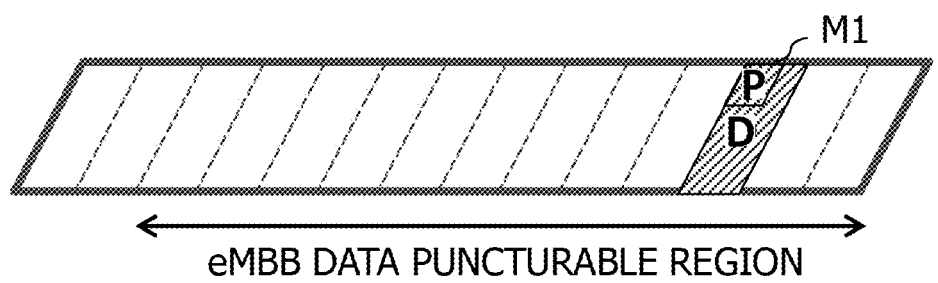
FIG. 3 depicts a diagram illustrating an example of interrupting transmission of the data for the URLLC in the data for the eMBB.

FIG. 3 depicts a diagram illustrating an example of interrupting transmission of the data for the URLLC in the data for the eMBB. The base station device 200 can perform interrupting (puncture) transmission of the data for the URLLC by using an eMBB data puncturable region serving as a portion of a data region in which the data for the eMBB is transmitted. The base station device 200 transmits the data for the URLLC by using, e.g., a message Ml. In the message Ml, "P" represents Preemption Indicator. The Preemption Indicator is an identifier for identifying that the data of concern (D in FIG. 3) is not the data for the eMBB and is, e.g., a part or the whole of a message header. Note that the interrupting transmission may use a plurality of regions in the eMBB data puncturable region or may also use a portion thereof.

<Example of Configuration of Base Station Device>

Figure 4:
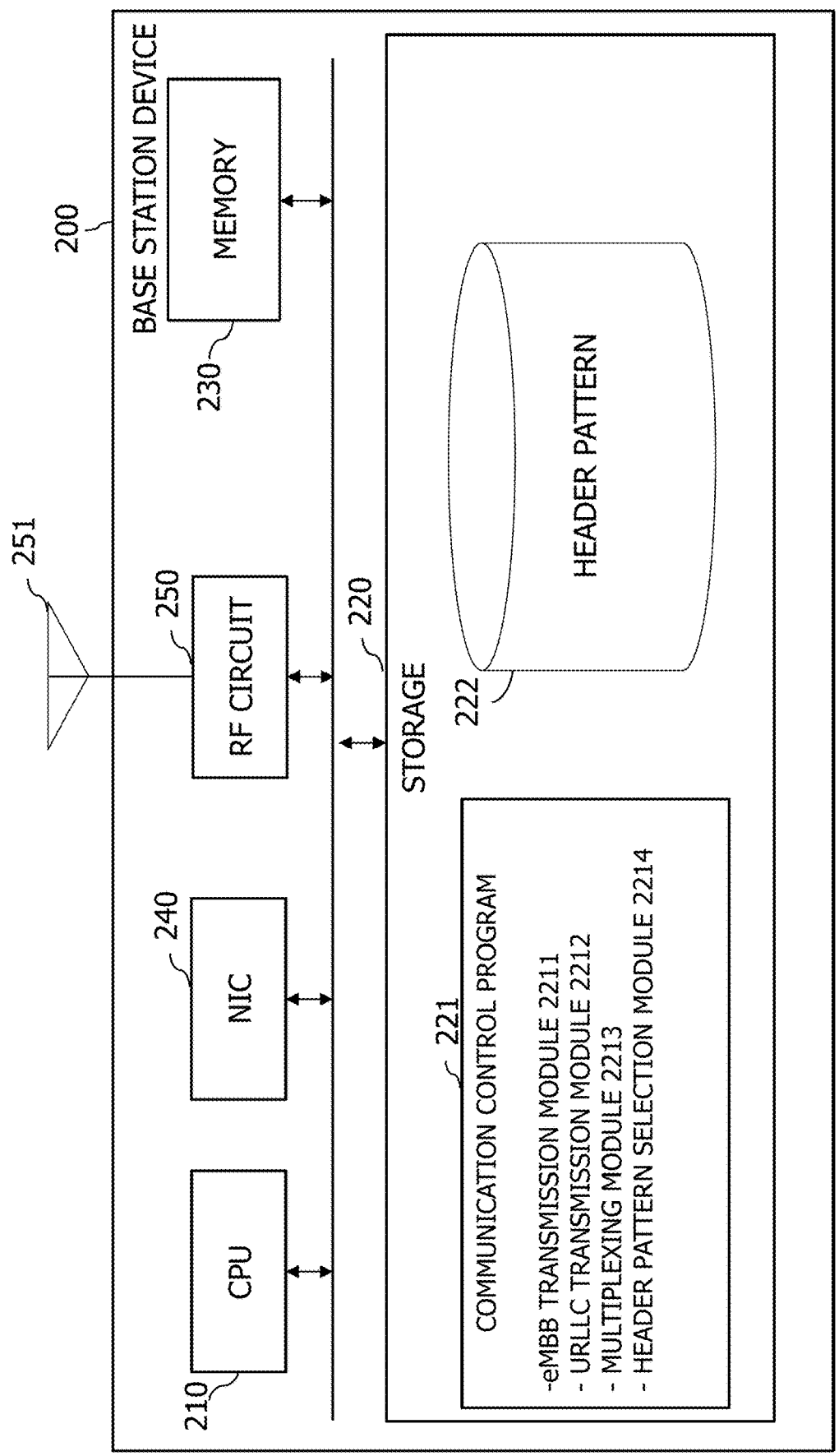
FIG. 4 depicts a diagram illustrating an example of a configuration of the base station device 200.

FIG. 4 depicts a diagram illustrating an example of a configuration of the base station device 200. The base station device 200 has a CPU (Central Processing Unit) 210, a storage 220, a memory 230 such as a DRAM (Dynamic Random Access Memory), an NIC (Network Interface Card) 240, and an RF (Radio Frequency) circuit 250. The base station device 200 is, e.g., a transmission device that transmits the data for the URLLC to the terminal device 100.

The storage 220 is an auxiliary storage device that stores a program and data, such as a flash memory, HDD (Hard Disk Drive), or an SSD (Solid State Drive). The storage 220 stores a communication control program 221 and a header pattern 222.

The header pattern 222 is a region in which a header pattern mentioned below is to be stored. Note that the header pattern 222 may also be included in the program.

The memory 230 is a region into which the program stored in the storage 220 is to be loaded. The memory 230 is used also as a region in which the program stores data.

The NIC 240 is a network interface to be connected to a network (not illustrated) such as the Internet or an intranet. The base station device 200 communicates with a communication device to be connected to the network via the NIC 240.

The RF circuit 250 is a device to be wirelessly connected to the terminal device 100. The RF circuit 250 has, e.g., an antenna 251.

The CPU 210 is a processor or a computer that loads the program stored in the storage 220 into the memory 230 and executes the loaded program to implement each processing.

The CPU 210 executes the communication control program 221 to build the transmission unit and the control unit and perform communication control processing. The communication control processing is processing of controlling wireless communication with the terminal device 100. In the communication control processing, the base station device 200 transmits the data for the eMBB (which may be hereinafter referred to as the eMBB data) and the data for the URLLC (which may be hereinafter referred to as the URLLC data) to the terminal device 100. The base station device 200 multiplexes the eMBB data and the URLLC data together in the communication control processing, selects a header pattern for the URLLC data, and notifies the terminal device 100 of the selected header pattern.

The CPU 210 executes an eMBB transmission module 2211 of the communication control program 221 to build the transmission unit and performs eMBB transmission processing. The eMBB transmission processing is processing of transmitting the eMBB data to the terminal device 100.

The CPU 210 executes a URLLC transmission module 2212 of the communication control program 221 to build the transmission unit and perform URLLC transmission processing. The URLLC transmission processing is processing of transmitting the URLLC data to the terminal device 100.

The CPU 210 executes a multiplexing module 2213 of the communication control program 221 to build the transmission unit and perform multiplexing processing. The multiplexing processing is processing of multiplexing the eMBB data and the URLLC data together. In the multiplexing processing, the base station device 200 causes the URLLC data to preempt a portion of the eMBB data puncturable region and thereby accomplishes the multiplexing.

The CPU 210 executes a header pattern selection module 2214 of the communication control program 221 to build the control unit and perform header pattern selection processing. The header pattern selection processing is processing of, e.g., selecting the header pattern of the URLLC data. When multiplexing, e.g., the eMBB data and the URLLC data together, the base station device 200 selects the header pattern on the basis of characteristics of the URLLC data to be transmitted.

<Example of Configuration of Terminal Device>

Figure 5:
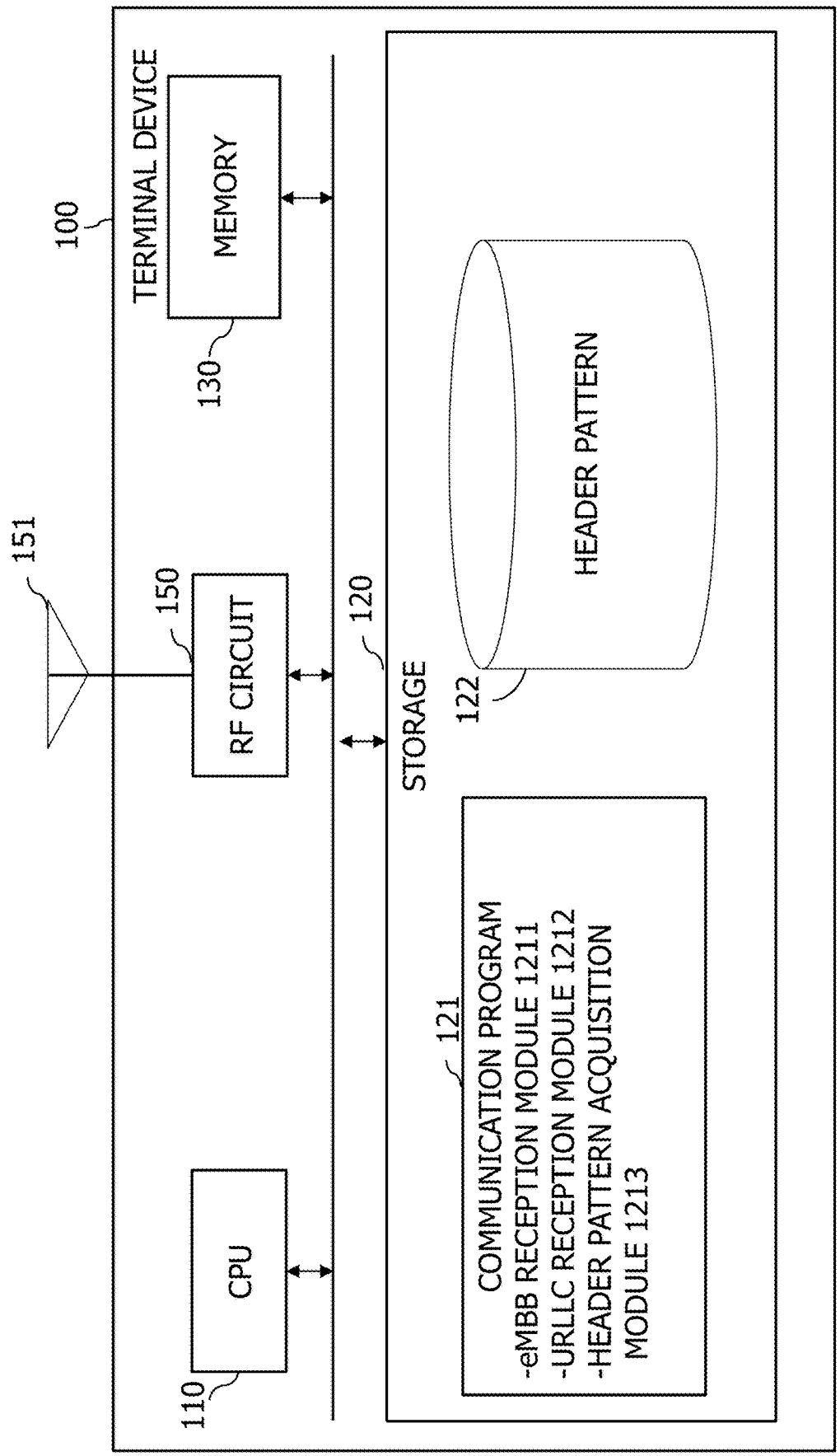
FIG. 5 depicts a diagram illustrating an example of a configuration of the terminal device 100.

FIG. 5 depicts a diagram illustrating an example of a configuration of the terminal device 100. The terminal device 100 has a CPU 110, a storage 120, a memory 130 such as a DRAM, and an RF circuit 150. The terminal device 100 is a reception device that receives, e.g., the data for the URLLC from the base station device 200.

The storage 120 is an auxiliary storage device that stores a program and data, such as a flash memory, a HDD, or an SSD. The storage 120 stores a communication program 121 and a header pattern 122.

The header pattern 122 is a region in which a header pattern mentioned below is to be stored. Note that the header pattern 122 may also be included in the program. Alternatively, the header pattern 122 may also be the same as, e.g., the header pattern 222 of the base station device 200.

The memory 130 is a region into which the program stored in the storage 120 is to be loaded. The memory 130 is used also as a region in which the program stores data.

The RF circuit 150 is a device to be wirelessly connected to the base station device 200. The RF circuit 150 has, e.g., an antenna 151.

The CPU 110 is a processor or a computer that loads the program stored in the storage 120 into the memory 130 and executes the loaded program to implement each processing.

The CPU 110 executes the communication program 121 to build the reception unit and a reception control unit and perform communication processing. The communication processing is processing of performing wireless communication with the base station device 200. The terminal device 100 receives the eMBB data and the URLLC data (including the multiplexed data). The terminal device 100 also acquires, from the base station device 200, the header pattern of the URLLC data when the eMBB data and the URLLC data are multiplexed together.

The CPU 110 executes an eMBB reception module 1211 of the communication program 121 to build the reception unit and performs eMBB reception processing. The eMBB reception processing is processing of receiving the eMBB data from the base station device 200.

The CPU 110 executes a URLLC reception module 1212 of the communication program 121 to build the reception unit and perform URLLC reception processing. The URLLC reception processing is processing of receiving the URLLC data from the base station device 200.

The CPU 110 executes a header pattern acquisition module 1213 of the communication program 121 to build the control unit and perform header pattern acquisition processing. The header pattern acquisition processing is processing of acquiring the header pattern selected by the base station device 200. In the header pattern acquisition processing, the terminal device 100 receives the header pattern reported from the base station device 200 to acquire the header pattern. Note that the terminal device 100 acquires the header pattern to be able to receive the URLLC data multiplexed together with the eMBB data.

<Data Transmission Processing>

Figure 6:
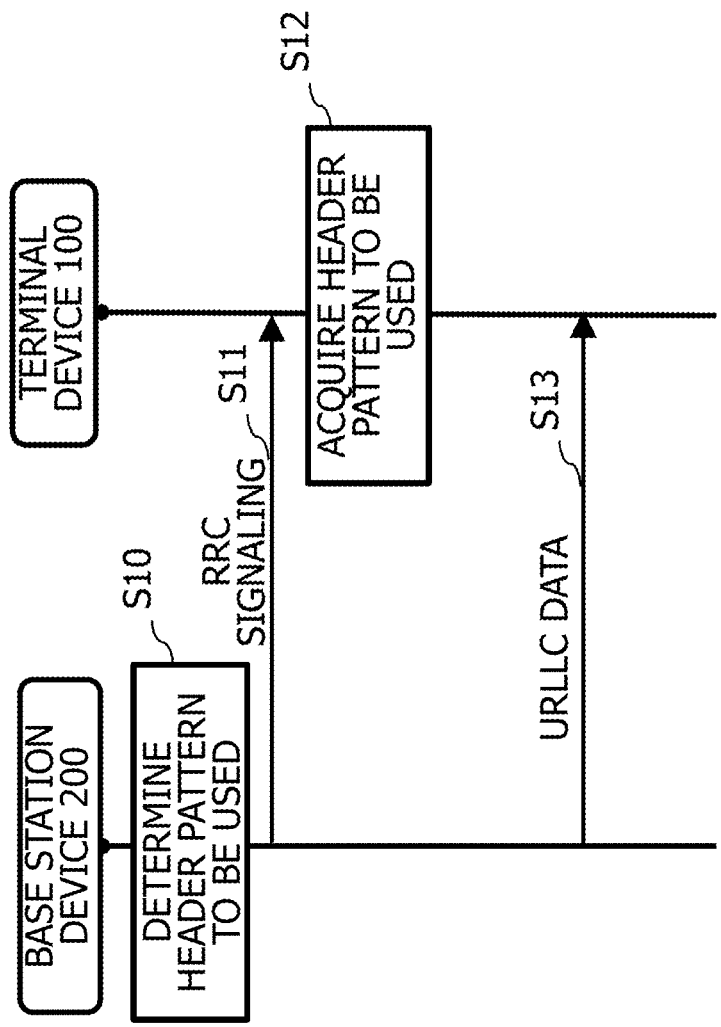
FIG. 6 depicts a diagram illustrating an example of a sequence of data transmission processing.

FIG. 6 depicts a diagram illustrating an example of a sequence of data transmission processing. When timing of transmitting data to the terminal device 100 comes, the base station device 200 determines a pattern (hereinafter referred to as the header pattern to be used) of a header to be used (S10). The base station device 200 determines the header pattern to be used on the basis of, e.g., whether or not the data to be transmitted is the URLLC data. The URLLC data is, e.g., data having a fixed length. The URLLC data is, e.g., data having a data size smaller than a predetermined value and smaller than that of the eMBB data.

The base station device 200 transmits the determined header pattern to be used to the terminal device 100 by using RRC signaling (S11). The RRC signaling is, e.g., a control signal including information for transmission/reception of an RRC message. Note that the transmission of the determined header pattern to be used is not limited to the use of the RRC signaling and may be a message or a signal received by the terminal device 100.

The terminal device 100 receives the RRC signaling to acquire the header pattern to be used (S12). Subsequently, the terminal device 100 waits for the data to be transmitted using the header pattern to be used from the base station device 200.

After notifying the terminal device 100 of the header pattern to be used, the base station device 200 transmits the data to the terminal device 100 by using the determined header pattern to be used.

<Header Pattern to Be Used in RLC Header>

A description will be given below of an example of the header pattern to be used in the RLC header. Note that 1 row in the following format represents 1 octet. The following description is given on the assumption that 1 octet corresponds to 1 byte (8 bits). All the patterns of the RLC header presented by way of example are in a format assuming an UM (Un acknowledge Mode), but can also be used appropriately even in an AM (Acknowledge Mode).

<1. RLC Basic Pattern>

A basic pattern is a generic header pattern to be used for transmission of any data. A description will be given below of the RLC basic pattern.

Figure 7:
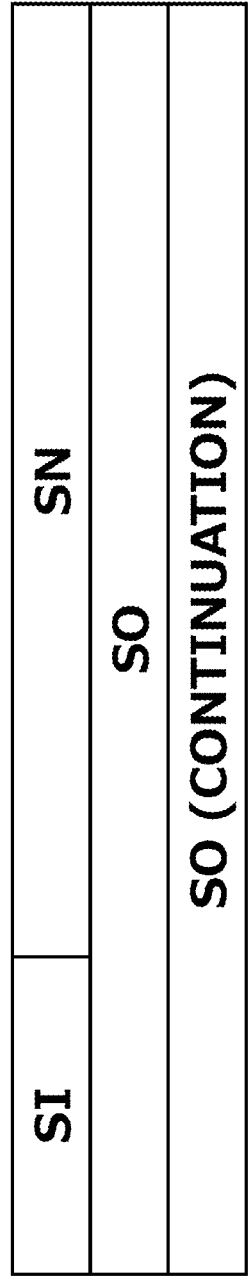
FIG. 7 depicts a diagram illustrating an example of an RLC header pattern 1.

FIG. 7 depicts a diagram illustrating an example of an RLC header pattern 1. SI represents segmentation information. SI is an information element indicating information related to segmentation of data and including 2 bits. In the case of, e.g., a first data segment as a result of segmentation, SI is "01". In the case of, e.g., a last data segment as a result of segmentation, SI is "10". In the case of, e.g., an intermediate data segment (data which is neither the first data nor the last data) as a result of segmentation, SI is "11". In the case of, e.g., unsegmented data, SI is "00".

SN represents a sequence number (which is hereinafter synonymous to RLC SN) in the RLC layer. SN is a numerical value representing an order of transmission of data, which is a recurring number such that, after reaching an upper limit value, the numerical value returns to a lower limit value to be used again. The RLC header pattern 1 has 6 bits as a region in which the SN is to be stored.

SO represents a segmentation offset. SO is information indicating to which byte position in a PDU before segmentation counted from a first position therein a first or last position in a data segment after segmentation corresponds. For example, SO represents the last position in the data.

Alternatively, SO may also represent, e.g., the first position in data to be subsequently transmitted. SO is an information element including 16 bits.

When the SO includes 16 bits (2 octets) and represents, e.g., a position in data in bytes, the RLC header pattern 1 can represent a maximum of 65536 byte data positions. Accordingly, the RLC header pattern 1 is used for transmission of, e.g., data having a relatively large data size.

<2. Pattern for URLLC>

A pattern for URLLC is a header pattern when, e.g., relatively-small-sized data such as the URLLC data is to be transmitted. The following will describe the pattern for URLLC.

<2.1 Replacement for SO>

FIG. 8A depicts a diagram illustrating an example of an RLC header pattern 2. SI and SN are the same as in FIG. 7. In the RLC header pattern 2, instead of SO in FIG. 7, Si is set.

Si is segmentation information representing a segment number of each of data segments and including, e.g., 8 bits. Si represents, e.g., what ordinal number the data segment corresponds. Note that the segment number may increase or decrease in a direction from a most significant bit to a lower significant bit of Si. Alternatively, Si may also include a plurality of bits the number of which is other than 8.

FIG. 8B depicts a diagram illustrating an example of a Si pattern 1. The Si pattern 1 is a pattern in which S1 to S8 each having 1 bit form Si. Sx (x is an integer of 1 to 8) represents an x-th data segment. For example, in a case of a first data segment, the bit of S1 is set to 1.

FIGS. 9A, 9B and 9C depict diagrams illustrating an example of the RLC header pattern 2 in the Si pattern 1. FIG. 9A depicts the diagram illustrating an example of the first data segment. FIG. 9A illustrates that SI=01 is satisfied, and the data corresponds to the first data segment. FIG. 9A further illustrates that the S1 bit is 1 and represents the first data segment.

FIG. 9B illustrates that SI=11 is satisfied, and the data of concern is the intermediate data segment. FIG. 9B further illustrates that S2 bit is 1 and represents the second data segment.

FIG. 9C illustrates that SI=10 is satisfied, and the data of concern is the last data segment. FIG. 9C further illustrates that the S3 bit is 1 and represents the third data segment.

The RLC header pattern 2 uses the 2-octet header which is 1 octet smaller than the header used in the RLC header pattern 1 to allow data to be transmitted. A requirement placed on the RLC header pattern 2 is such that the segment number is not more than 8. Accordingly, the RLC header pattern 2 is appropriate for transmitting data having a small data size and a small segment number such as for, e.g., the URLLC. When transmitting, e.g., the URLLC data, the base station device 200 uses the RLC header pattern 2 to be able to transmit data by using a header portion having a size smaller than when the RLC header pattern 1 is used and reduce an overhead due to the transmission of the header portion. Alternatively, when transmitting the URLLC data multiplexed together with the eMBB data, the base station device 200 uses the RLC header pattern 2 to be able to reduce an overhead due to the transmission of the header portion.

FIGS. 10A, 10B, 10C, 10D and 10E depict diagrams illustrating an example of a Si pattern in which an R bit is set in a portion of Si. By setting the R (Reserved) bit (reserve bit) in Si, it is possible to secure a scalability in preparation for, e.g., a future specification change or the like.

FIG. 10A depicts the diagram illustrating an example of a Si pattern 2. The Si pattern 2 is a Si pattern in which the R bit is set as a first bit, and S1 is not set. S1 represents a first data segment. However, since SI=01 can represent the first data, S1 can be omitted.

FIG. 10B depicts the diagram illustrating an example of a Si pattern 3. The Si pattern 3 is a Si pattern in which the R bit is set as a first bit, and S8 is not set. S8 represents an eighth data segment. When the Si pattern 3 is defined to be in a format in which 8 is an upper-limit segment number, SI=10 can indicate last data, and the terminal device 100 can recognize that the last data is the eighth data segment and S8 can be omitted. When it is sufficient for the base station device 200 to support a segment number up to 7, S8 can be omitted.

FIG. 10C depicts the diagram illustrating an example of a Si pattern 4. The Si pattern 4 is a Si pattern in which the R bit is set as each of a first bit and a last bit, and S1 and S8 are not set.

FIG. 10D depicts the diagram illustrating an example of a Si pattern 5. The Si pattern 5 is a Si pattern in which the R bit is set as each of a first bit and a last bit, and S7 and S8 are not set. When it is sufficient for the base station device 200 to support a segment number up to 6, S7 and S8 can be omitted.

FIG. 10E depicts a diagram illustrating an example of a Si pattern 6. The Si pattern 6 is a Si pattern in which the R bit is set as each of a first bit and a second bit, and S7 and S8 are not set. When it is sufficient for the base station device 200 to support a segment number up to 6, S7 and S8 can be omitted.

FIGS. 10A, 10B, 10C, 10D and 10E illustrate the Si pattern in which one or two R bits are set. However, 3 or more R bits may also be set. As illustrated in FIGS. 10A, 10B, 10C, 10D and 10E, a position of each of the R bits is not limited to a first-bit position, a last-bit position, and a second-bit position, and may also be set at any position.

<2.1.1 Omission of Si>

The base station device 200 may also omit Si in first data or in last data.

FIGS. 11A, 11B and 11C depict diagrams illustrating an example of a header in which Si in the first data is omitted in each of the RLC header pattern 2 and the Si pattern 2. FIG. 11A depicts the diagram illustrating an example of the first data segment. FIG. 11A illustrates that SI=01 is satisfied, and the data is the first data segment. The terminal device 100 can recognize that the data is the first (head) data, and consequently the base station device 200 can omit Si.

FIG. 11B illustrates that SI=11 is satisfied, and the data is an intermediate data segment. FIG. 11B further illustrates that S2 bit is 1 and represents a second data segment. Note that the R bit is, e.g., 0.

FIG. 11C illustrates that SI=10 is satisfied, and the data is a last data segment. FIG. 11C further illustrates that the S3 bit is 1 and represents a third data segment.

FIGS. 12A, 12B and 12C depict diagrams illustrating an example of a header in which Si in each of first data and last data is omitted in each of the RLC header pattern 2 and the Si pattern 4. FIG. 12A depicts the diagram illustrating an example of the first data segment. FIG. 12A illustrates that SI=01 is satisfied, and the data is a first data segment. The terminal device 100 can recognize that the data is the first (head) data, and consequently the base station device 200 can omit Si.

FIG. 12B illustrates that SI=11 is satisfied, and the data is an intermediate data segment. FIG. 12B further illustrates that the S2 bit is 1 and represents a second data segment.

FIG. 12C illustrates that SI=10 is satisfied, and the data is a last data segment. Since the terminal device 100 receives the data after receiving the data illustrated in FIG. 12B, the terminal device 100 can recognize that the last data is third data, and therefore omits Si.

Note that FIGS. 11A, 11B, 11C, 12A, 12B and 12C have been described using the Si pattern 2 and the Si pattern 4, but Si in each of the first data and the last data can similarly be omitted even in another Si pattern. By omitting Si, the base station device 200 can reduce an amount of data in a header portion and reduce an overhead due to header transmission. In addition, by omitting Si when transmitting the URLLC data multiplexed together with the eMBB data, the base station device 200 can reduce the overhead due to the transmission of the header portion.

<2.2 Optimization of SO>

Figure 13:
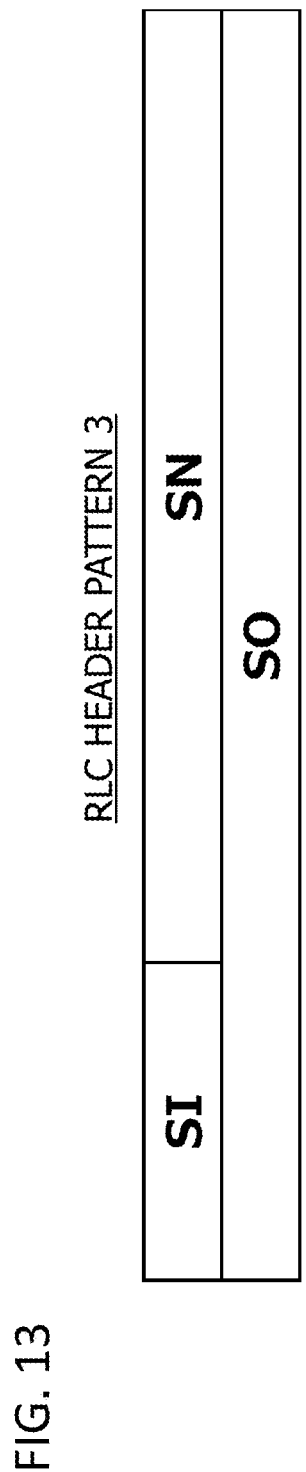
FIG. 13 depicts a diagram illustrating an example of an RLC header pattern 3.

FIG. 13 depicts a diagram illustrating an example of an RLC header pattern 3. SI and SN are the same as in FIG. 7. In the RLC header pattern 3, SO includes 1 octet (8 bits). When SO includes the 8 bits (1 octet) and when, e.g., a position of data is represented in bytes, it is possible to represent a maximum of 256 byte data positions. A data size that can be transmitted with the RLC header pattern 3 is smaller than a data size that can be transmitted with the RLC header pattern 1 in which SO includes 16 bits, but data in a header portion corresponding to 1 octet can be omitted. Therefore, the RLC header pattern 3 is appropriate for transmitting data having a relatively small data size such that the URLLC data.

<2.2.1 Omission of SO>

FIGS. 14A, 14B and 14C depict diagrams illustrating an example of a header of the RLC header pattern 3 in which SO in first data is omitted. FIG. 14A depicts the diagram illustrating an example of a first data segment. FIG. 14A illustrates that SI=01 is satisfied, and the data is the first data segment. The terminal device 100 can recognize that the data is the first (head) data, and therefore the base station device 200 can omit SO.

FIG. 14B illustrates that SI=11 is satisfied, and the data is an intermediate data segment. FIG. 14B further illustrates that SO is 33, and the data has 33 octets at an end thereof.

FIG. 14C illustrates that SI=10 is satisfied, and the data of concern is a last data segment. FIG. 11C further illustrates that SO is 66, and the data has 66 octets at an end thereof.

FIGS. 15A, 15B and 15C depict diagrams illustrating an example of a header of the RLC header pattern 3 in which SO in each of first data and last data is omitted. FIGS. 15A and 15B are the same as FIGS. 14A and 14B, respectively.

FIG. 15C illustrates that SI=10 is satisfied, and the data is a last data segment. When, e.g., the data segment has a fixed length, the terminal device 100 can recognize a position of the data even without SO. Therefore, the base station device 200 can omit SO.

In the second embodiment, when transmitting, e.g., the URLLC data multiplexed together with the eMBB data, the base station device 200 uses the RLC header patterns 2 and 3 and optimizes SO or replaces SO with Si, so that being able to reduce an amount of data in a header and reduce an overhead due to transmission of a header portion.

Third Embodiment

Next, a description will be given of a third embodiment. In the third embodiment, the base station device 200 also selects a header format for a PDCP header.

<1. Unsegmented Pattern>

A description will be given of a PDCP header pattern when there is no segmentation (no segmentation in the PDCP layer is performed).

FIG. 16A depicts a diagram illustrating an example of a header pattern of an unsegmented PDCP header pattern 1. SI represents segment information. SI is an information element indicating information related to segmentation of data and including 2 bits.

DC (Data/Control) is data control indicating that the PDU is either for a user plane or for a control plane. DC is an information element including 1 bit.

PDCP SN is a sequence number in the PDCP layer. The unsegmented PDCP header pattern 1 has a 12-bit field region as a region in which PDCP SN is to be embedded.

The unsegmented PDCP header pattern 1 has nine R bits.

FIG. 16B depicts a diagram illustrating an example of a header pattern of an unsegmented PDCP header pattern 2. SI, DC, and PDCP SN are the same as in the unsegmented PDCP header pattern 1.

The unsegmented PDCP header pattern 2 has one R bit, and accordingly smaller in size than the unsegmented PDCP header pattern 1 by 8 bits (1 octet).

<2. Segmented Pattern>

A description will be given of a PDCP header pattern when there is segmentation (segmentation in the PDCP layer is performed). Note that, for a segmented header pattern, not only the PDCP header, but also the RLC header is defined, and a description will be given of each of the PDCP header and the RLC header. When there is segmentation, the RLC header is also defined but, for the sake of convenience, the RLC header may be referred to also as the PDCP header.

FIG. 17A depicts a diagram illustrating an example of a header pattern of a segmented PDCP header pattern 1. An RLC header portion of the segmented PDCP header pattern 1 having most significant 3 octets is the same as in the RLC header pattern illustrated in FIG. 7 (SN in FIG. 7 is the same as RLC SN in FIGS. 17A, 17B and 17C).

A PDCP header portion of the segmented PDCP header pattern 1 having lower-significant 2 octets has 1-bit DC, three R bits, and 12-bit PDCP SN.

FIG. 17B depicts a diagram illustrating an example of a header pattern of a segmented PDCP header pattern 2. An RLC header portion of the segmented PDCP header pattern 2 having most significant 19 bits (most significant two octets and most significant 3 bits in a third octet) has SI, RLC SN, and 11-bit SO.

The PDCP header portion of the segmented PDCP header pattern 2 having lower-significant 13 bits (lower-significant 5 bits in the third octet and a fourth octet) has 1-bit DC and 12-bit PDCP SN.

In other words, the segmented PDCP header pattern 2 is obtained by omitting the R bit in the segmented PDCP header pattern 1 and a portion (5 bits) of SO, so that the RLC header and the PDCP header become a total of 4 octets.

FIG. 17C depicts a diagram illustrating an example of a header pattern of a segmented PDCP header pattern 3. An RLC header portion of the segmented PDCP header pattern 2 having the most significant 11 bits (a most significant first octet and the most significant 3 bits of a second octet) has SI, RLC SN, and 3-bit SO. A PDCP header portion of the segmented PDCP header pattern 3 is the same as the PDCP header portion of the segmented PDCP header pattern 2.

In other words, the segmented PDCP header pattern 3 is obtained by omitting a portion (8 bits) of SO of the segmented PDCP header pattern 2, so that the RLC header and the PDCP header become a total of 3 octets.

<Modification 1>

FIGS. 18A and 18B depict diagrams illustrating an example of a PDCP header in which PDCP SN is defined to have 6 bits. FIG. 18A illustrates the PDCP header including 2-bit SI and 6-bit PDCP SN.

FIG. 18B depicts the diagram illustrating an example of a PDCP header obtained by adding 8-bit SO to the PDCP header in FIG. 18A.

Each of the headers in FIGS. 18A and 18B includes no R bit and no DC. When it is assumed that, e.g., DC is used only in the user plane, DC can be omitted.

<Modification 2>

The base station device 200 may also define an RLC-PDCP concatenated header.

FIGS. 19A and 19B depict diagrams illustrating a segmented concatenated header pattern. FIG. 19A depicts the diagram illustrating an example of a segmented concatenated header pattern 1. The segmented concatenated header pattern 1 has 2-bit SI, one R bit, 1-bit DC, 12-bit PDCP SN, and 8-bit SO or Si.

FIG. 19B depicts the diagram illustrating an example of a segmented concatenated header pattern 2. The segmented concatenated header pattern 2 has the same information element as that of the segmented concatenated header pattern 1, but is different from the segmented concatenated header pattern 1 in respective positions at which SO or Si, DC, and PDCP SN are placed.

FIGS. 20A and 20B depict diagrams illustrating an example of a segmented concatenated header pattern. FIG. 20A depicts the diagram illustrating an example of a segmented concatenated header pattern 3. The segmented concatenated header pattern 3 has 2-bit SI, 6-bit PDCP SN, and 8-bit SO or Si.

FIG. 20B depicts the diagram illustrating an example of a segmented concatenated header pattern 4. The segmented concatenated header pattern 4 has the same information element as that of the segmented concatenated header pattern 3, but is different from the segmented concatenated header pattern 3 in respective positions at which SO or Si and PDCP SN are placed.

The segmented concatenated header patterns 3 and 4 are obtained by omitting DC, the R bit, and a portion (6 bits) of PDCP SN from the segmented concatenated header patterns 1 and 2. Each of the segmented concatenated header patterns 1 and 2 includes 3 octets, while each of the segmented concatenated header patterns 3 and 4 includes 2 octets.

Fourth Embodiment

In a fourth embodiment, a header pattern corresponding to an AM (Acknowledge Mode) is described.

FIGS. 21A and 21B depict diagrams illustrating an example of an RLC header pattern corresponding to AM. FIG. 21A depicts the diagram illustrating an example of an AM RLC header pattern 1. The AM RLC header pattern 1 has 1-bit DC, 1-bit P bit, 2-bit SI, 12-bit SN, and 8-bit SO or Si. The P bit represents a polling bit (P bit). The P bit is a bit indicating, e.g., whether or not a request for STATUS PDU is to be made, which is 1 when a request for STATUS PDU is to be made.

FIG. 21B depicts the diagram illustrating an example of an AM RLC header pattern 2. The AM RLC header pattern 1 has 1-bit DC, 1-bit P bit, 2-bit SI, two R bits, 18-bit SN, and 8-bit SO or Si.

FIGS. 22A and 22B depict diagrams illustrating an example of a header pattern obtained by concatenating a PDCP header and an AM RLC header each corresponding to AM together. FIG. 22A depicts the diagram illustrating an example of an AM unsegmented concatenated header pattern. The AM unsegmented concatenated header pattern has 1-bit DC, 1-bit P bit, 2-bit SI, and 4-bit PDCP SN.

FIG. 22B depicts the diagram illustrating an example of an AM segmented concatenated header pattern. The AM segmented concatenated header pattern has 1-bit DC, 1-bit P bit, 2-bit SI, 4-bit PDCP SN, and 8-bit SO or Si.

As described above, the base station device 200 can also handle an AM header in the same manner as handling a UM header.

Other Embodiments

Individual embodiments may also be combined with each other.

For example, either of SO and Si may be selected depending on a segment number or a data size. Also, a combination of the RLC header and the PDCP header may also be another combination other than that in the example described above. Each of the information elements may also be omitted depending on the presence or absence of segmentation, the segment number, the data size, whether or not data has a fixed length, or the like. Alternatively, each of the information elements may also be omitted on the basis of an agreement between the base station device 200 and the terminal device 100.

A disclosure can reduce an overhead due to transmission of a header portion.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

10 Communication system
100 Terminal device
110 CPU
120 Storage
121 Communication program
130 Memory
150 RF circuit
151 Antenna
200 Base station device
210 CPU
220 Storage
221 Communication control program
230 Memory
250 RF circuit
251 Antenna
290 Transmission unit 291 Control unit
1211 eMBB reception module
1212 URLLC reception module
1213 Header pattern acquisition module
2211 eMBB transmission module
2212 URLLC transmission module
2213 Multiplexing module
2214 Header pattern selection module

What is claimed is:

1. A base station device comprising:
   a transmitter configured to transmit first data of a first type and second data of a second type; and
   processor circuitry configured to omit, when the transmitter multiplexes and transmits the first data and the second data, at least a portion of a segmentation offset or at least a portion of a reserve bit included in a radio link control (RLC) header of the second data,
   wherein omitting of at least the portion of the segmentation offset or at least the portion of the reserve bit includes:
   when the transmitter multiplexes and transmits the first data and the second data,
      omitting the portion of the segmentation offset without omitting a remaining portion of the segmentation offset; or
      omitting at least the portion of the reserve bit included in the RLC header of the second data.

2. The base station device according to claim 1, wherein the processor circuitry is further configured to omit, from the RLC header, the segmentation offset and add segmentation information indicating an order of segmentation of the second data.

3. The base station device according to claim 2, wherein the segmentation information has a plurality of bits, and
   the processor circuitry is further configured to turn ON a bit of the plurality of bits, the bit of the plurality of bits being in accordance with the order of segmentation of the second data.

4. The base station device according to claim 1, wherein, when the order of segmentation of the second data is placed at a starting position, the processor circuitry is further configured to omit the segmentation offset.

5. The base station device according to claim 1, wherein, when the order of segmentation of the second data is placed at an ending position, the processor circuitry is further configured to omit the segmentation offset.

6. The base station device according to claim 1, wherein, when the second data is not segmented, the processor circuitry is further configured to omit the segmentation offset.

7. The base station device according to claim 1, wherein the processor circuitry is further configured to omit, when the transmitter multiplexes and transmits the first data and the second data, at least a portion of the segmentation offset and at least a portion of the reserve bit included in the RLC header of the second data.

8. The base station device according to claim 1, wherein the processor circuitry is further configured to omit a portion of a region in which a sequence number of an RLC layer is stored.

9. The base station device according to claim 1, wherein the processor circuitry is further configured to omit a portion of a region in which a sequence number of a packet data convergence protocol (PDCP) layer is embedded.

10. The base station device according to claim 1, wherein, when not using the second data for control, the processor circuitry is further configured to omit an information element that is included in a PDCP header and that indicates whether the second data is for a control plane or for a user plane.

11. The base station device according to claim 1, wherein the processor circuitry is further configured to concatenate the RLC header and a PDCP header and omit a portion of a sequence number of a header that is concatenated.

12. The base station device according to claim 11, wherein, when not using the second data for control, the processor circuitry is further configured to omit an information element that is included in the header and that indicates whether the second data is for a control plane or for a user plane.

13. The base station device according to claim 1, wherein the second data has a fixed length.

14. The base station device according to claim 13, wherein the second type includes ultra-reliable and low latency communication (URLLC), and/or
   wherein the first type includes enhanced mobile broadband (eMBB).

15. The base station device according to claim 1, wherein the second data has a data size less than that of the first data.

16. The base station device according to claim 1, wherein the processor circuitry is further configured to notify a device, which is a destination of transmission of the second data, of information relating to a format of the RLC header to be used to transmit the second data.

17. A terminal device comprising:
   a receiver configured to receive first data of a first type and second data of a second type; and
   processor circuitry configured to retrieve, as the second data, data included in a region of the first data and having an RLC header with:
      a portion of a segmentation offset being omitted without a reaming in portion of the segmentation offset being omitted; or
      at least a portion of a reserve bit being omitted
   when the receiver receives the first data and the second data multiplexed.

18. A communication method comprising:
   transmitting first data of a first type and second data of a second type; and
   omitting, when the first data and the second data are multiplexed in the transmission, at least a portion of a segmentation offset or at least a portion of a reserve bit included in an RLC header of the second data,
   wherein omitting of at least the portion of the segmentation offset or at least the portion of the reserve bit includes:
   when the first data and the second data are multiplexed in the transmission,
      omitting the portion of the segmentation offset without omitting a remaining portion of the segmentation offset; or
      omitting at least the portion of the reserve bit included in the RLC header of the second data.

19. A communication system comprising:
   a base station device including a transmitter that transmits first data of a first type and second data of a second type, and first processor circuitry that is configured to omit, when the transmitter multiplexes and transmits the first data and the second data, at least a portion of a segmentation offset or at least a portion of a reserve bit included in an RLC header of the second data,
   wherein omitting of at least the portion of the segmentation offset or at least the portion of the reserve bit includes:

when the transmitter multiplexes and transmits the first data and the second data,
  omitting the portion of the segmentation offset without omitting a remaining portion of the segmentation offset; or
  omitting at least the portion of the reserve bit included in the RLC header of the second data; and
a terminal device including a receiver that receives the first data and the second data, and second processor circuitry that is configured to retrieve, as the second data, data included in a region of the first data and having the RLC header when the receiver receives the first data and the second data multiplexed.

\* \* \* \* \*